United States Patent
Otani

(10) Patent No.: US 7,657,720 B2
(45) Date of Patent: Feb. 2, 2010

(54) STORAGE APPARATUS AND METHOD OF MANAGING DATA USING THE STORAGE APPARATUS

(75) Inventor: Toshio Otani, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 294 days.

(21) Appl. No.: 11/583,647

(22) Filed: Oct. 17, 2006

(65) Prior Publication Data

US 2008/0059733 A1     Mar. 6, 2008

(30) Foreign Application Priority Data

Sep. 4, 2006    (JP)   ............................. 2006-239590

(51) Int. Cl.
*G06F 12/00*     (2006.01)
(52) U.S. Cl. ........................ 711/162; 707/204; 711/114
(58) Field of Classification Search ................. 711/114, 711/162; 707/204
See application file for complete search history.

(56) References Cited

U.S. PATENT DOCUMENTS 6,694,413 B1     2/2004    Mimatsu et al.

2007/0156985 A1*    7/2007    Tsai et al. .................... 711/162
2007/0300013 A1*    12/2007    Kitamura ..................... 711/114

FOREIGN PATENT DOCUMENTS

JP     2001-306407 A     11/2001
JP     2002-297427 A     10/2002

* cited by examiner

*Primary Examiner*—Brian R Peugh
*Assistant Examiner*—Mehdi Namazi
(74) *Attorney, Agent, or Firm*—Sughrue Mion, PLLC

(57) ABSTRACT

Provided is a storage apparatus operable to prevent incomplete backup and perform efficient backup even in systems characterized by a relatively small backup window and high degrees of utilization by users. This storage apparatus performs a snapshot of a volume storing data, using a logoff or login request at a certain point in time within in the backup window as a trigger, and creates a replication volume of the volume based on the acquired snapshot. To achieve the data consistency, when a login request is made, the storage apparatus temporarily suspends processing for establishing a session until the snapshot is created, and resumes such processing for establishing the session based on a login request after the snapshot is created. In one implementation, the replication volume is created in the background.

18 Claims, 18 Drawing Sheets

VOLUME ALLOCATION INFORMATION

| NO. | VOLUME NAME | ALLOCATION SIZE | TARGET NAME | INITIATOR NAME |
|---|---|---|---|---|
| 1 | Volume_1001 | 20GB | Target_1001 | Initiator_1001 |
| 2 | Volume_1002 | 20GB | Target_1002 | Initiator_1002 |
| 3 | Volume_1003 | 20GB | Target_1003 | Initiator_1003 |
| 4 | Volume_1004 | 20GB | Target_1004 | Initiator_1004 |
| 5 | Volume_1005 | 20GB | Target_1005 | Initiator_1005 |
| : | : | : | : | : |

*Fig. 6*

SESSION MANAGEMENT INFORMATION

| NO. | VOLUME NAME | TARGET NAME | INITIATOR NAME | iSCSI SESSION |
|---|---|---|---|---|
| 1 | Volume_1001 | Target_1001 | Initiator_1001 | OFF |
| 2 | Volume_1002 | Target_1002 | Initiator_1002 | ON |
| 3 | Volume_1003 | Target_1003 | Initiator_1003 | ON |
| 4 | Volume_1004 | Target_1004 | Initiator_1004 | OFF |
| 5 | Volume_1005 | Target_1005 | Initiator_1005 | ON |
| : | : | : | : | : |

*Fig. 7*

BACKUP MANAGEMENT INFORMATION

| NO. | VOLUME NAME | STATUS |
|---|---|---|
| 1 | Volume_1001 | Online |
| 2 | Volume_1002 | Done |
| 3 | Volume_1003 | Ready |
| 4 | Volume_1004 | Online |
| 5 | Volume_1005 | Ready |
| : | : | : |

*Fig. 8A*

BACKUP MANAGEMENT INFORMATION

| NO. | VOLUME NAME | STATUS |
|---|---|---|
| 1 | Volume_1001 | Online |
| 2 | Volume_1002 | Done |
| 3 | Volume_1003 | Error |
| 4 | Volume_1004 | Ready |
| 5 | Volume_1005 | Done |
| : | : | : |

*Fig. 8B*

BACKUP MANAGEMENT INFORMATION

| NO. | VOLUME NAME | STATUS |
|---|---|---|
| 1 | Volume_1001 | Online |
| 2 | Volume_1002 | Done |
| 3 | Volume_1003 | Done(ss) |
| 4 | Volume_1004 | Done |
| 5 | Volume_1005 | Done |
| : | : | : |

*Fig. 8C*

| MASTER VOLUME | SNAPSHOT VOLUME | BITMAP |
|---|---|---|
| AAA | AAA | 0 |
| BBB | BBB | 0 |
| CCC | nnn | 1 |
| DDD | DDD | 0 |
| EEE | EEE | 0 |
| FFF | FFF | 0 |
| GGG | mmm | 1 |
| HHH | HHH | 0 |
| III | III | 0 |
| JJJ | JJJ | 0 |

*Fig. 10*

STORAGE APPARATUS AND METHOD OF MANAGING DATA USING THE STORAGE APPARATUS

CROSS-REFERENCES TO RELATED APPLICATIONS

This application relates to and claims priority from Japanese Patent Application No. 2006-239590, filed on Sep. 4, 2006, the entire disclosure of which is incorporated herein by reference.

BACKGROUND

The present invention generally relates to storage devices and data backup methods associated with such storage devices, and, more specifically, to data backup technology in context of a storage apparatus accessed from a host apparatus connected via a network.

In order to prevent the corruption or loss of data in a computer system, it is important to periodically back up the data stored in the storage apparatus. The backup of data is typically achieved by periodically copying the whole or part of a data volume (hereinafter simply referred to as "volume"). Such copies are maintained at a different storage site, thereby resulting in creating a replication volume (backup data) of the primary volume. When data on the volume is damaged or lost, the state of the data volume before such loss can be restored by restoring the backed up data to its original location.

Snapshot is also known as technology used in the backup of data. The snapshot is a technique for storing a data image of a volume at a certain point in time. For example, even when data is lost due to a failure, the state of the volume before such loss can be restored by referring to the stored snapshot image. Using the snapshot technique, one can maintain the state of a volume at a certain point in time more efficiently than using the method of creating a replication volume by simply copying the entity of data.

As one example of using the snapshot technology, Japanese Patent Laid-Open Publication No. 2001-306407 discloses providing one of the independent redundant storage extents to a computer for normal access, and providing the other storage extent for acquiring a snapshot image.

Because the data consistency will be lost if the data is rewritten during the backup procedure of the data to be maintained, it is necessary to guarantee that the rewriting of data will not be performed during the backup procedure. Therefore, in view of data consistency, after inspecting the usage status of volumes in a period of time when volumes are not generally accessed; for instance, late at night and on holidays, data is copied to a volume of an unused status.

For purposes of backup scheduling, the time frame in which data can be backed up is referred to as a backup window. For the backup of data, all processing routines from start to finish need to be performed during the backup window.

Because data backup processing requires a certain amount of time, there may be cases where backup processing cannot be completed within the backup window, especially when the backup window is small or the number of volumes (or the amount of data) to be backed up is large. Thus, Japanese Patent Laid-Open Publication No. 2002-297427 discloses performing backup scheduling based on the importance of data to be maintained or the reliability of the storage apparatus.

With backup processing, because only the volumes that were backed up until a certain point in time can be restored, if the period from completing the backup to starting the subsequent backup is long, data that was rewritten during such period cannot be restored. In contrast, if backup is frequently performed, not only will the system performance deteriorate, this will cause increased costs associated with the backup. RPO (Recovery Point Objective) is an index showing the frequency of backup processing, and the method of setting the RPO relates to the operational costs of the storage apparatus.

Upon installing and operating a storage apparatus, reduction of costs for backup is desirable. In a system using a storage apparatus that provides one or more volumes to a plurality of personal computers, for purposes of reducing costs for backup, for example, RPO can be set to be performed once a day. In addition, a single backup module can be used for performing backup processing to as many volumes as possible.

Nevertheless, with a system that follows the aforesaid RPO backup policy, for example, when there is an act of invading the backup window such as in an exceptional usage where a user operates the computer until late at night and boots such computer early in the morning, the usage will not conform to a predetermined backup schedule, and a so-called "incomplete" backup may occur. Further, when one backup module performs the backup of numerous data volumes, there is a possibility that processing cannot be completed within the backup window depending on the data volume to be backed up.

SUMMARY

In order to solve the foregoing problems, the present invention performs a snapshot of a volume storing data to acquire a snapshot image based on a request concerning a session such as a login or logoff (logout) request at a certain point in time according to a backup schedule, and creates a replication volume of a volume based on the acquired snapshot image.

In accordance with one aspect of the inventive concept, when a login request is issued, processing for establishing the session is temporarily suspended until the snapshot image is acquired, and thereafter processing for establishing the session based on the login request is resumed after the snapshot image is acquired.

Further, when a logoff request is issued, a snapshot is performed to acquire a snapshot image after performing processing for discontinuing the session.

With respect to volumes in which the snapshot image has been acquired, a replication volume is created based on such snapshot image as needed.

More specifically, according to one aspect of the present invention, provided is a storage apparatus operatively connected to a host apparatus comprising a disk device forming one or more volumes, and a controller unit configured to control the disk device. Based on a request for establishment of a session to a prescribed volume sent from the host apparatus, the controller unit performs a snapshot of the prescribed volume to acquire a snapshot image, and creates a replication volume based on the acquired snapshot image.

Furthermore, according to one aspect of the present invention, provided is a method of managing data in a storage apparatus operatively connected to a host apparatus. The method comprises receiving from the host apparatus a request for establishment of a session to a prescribed volume formed on a disk device disposed in the storage apparatus, acquiring a snapshot image by performing a snapshot of the prescribed volume based on the request, and creating a replication volume of the prescribed volume based on the acquired snapshot image.

According to an aspect of the inventive concept, it is possible to prevent incomplete backup and perform efficient backup even in systems set with a relatively small backup window and exceptional usages by users. Further, it will be possible to efficiently perform backup within the backup window to the large amount of data.

DESCRIPTION OF DRAWINGS

The accompanying drawings, which are incorporated in and constitute a part of this specification exemplify the embodiments of the present invention and, together with the description, serve to explain and illustrate principles of the inventive technique. Specifically:

FIG. 6 is a diagram showing volume allocation information according to an embodiment of the present invention;

FIG. 7 is a diagram showing session management information according to an embodiment of the present invention;

FIGS. 8A-8C are diagrams showing backup management information according to an embodiment of the present invention;

FIG. 10 is a diagram explaining snapshot processing according to an embodiment of the present invention;

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
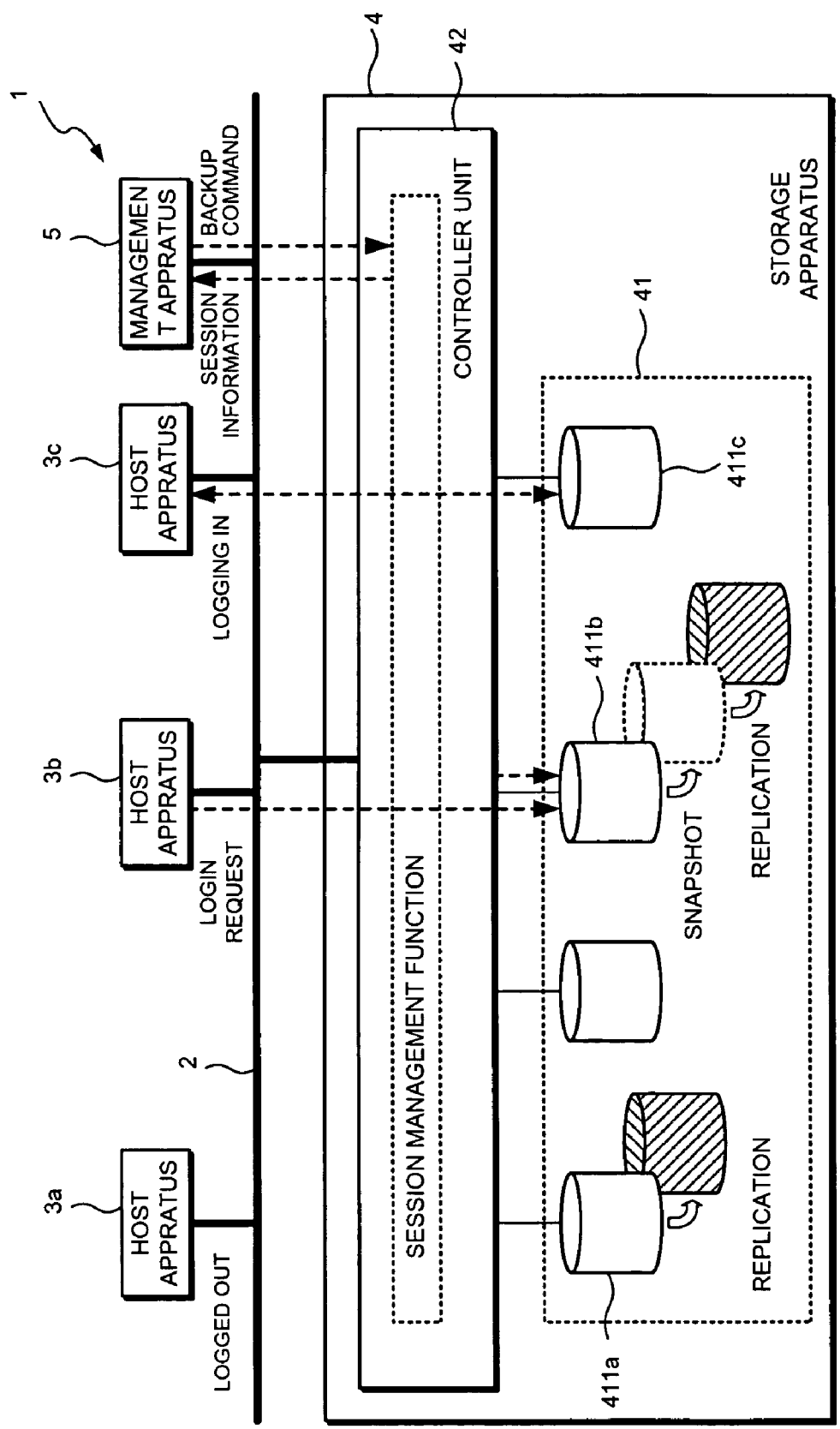
FIG. 1 is a conceptual diagram explaining data backup processing in the storage system according to an embodiment of the present invention.

FIG. 1 is a conceptual diagram illustrating data backup processing in a storage system 1 according to an embodiment of the present invention.

The present invention provides a system or a method for acquiring a snapshot image by performing a snapshot of a volume storing data based on a request associated with a session, such as a logoff or login request at a certain point in time within the backup window (to be precise, this is not limited to being within the backup window), and further creating a replication volume of the volume based on the acquired snapshot.

In this embodiment, to achieve data consistency, when a login request is issued, the storage apparatus temporarily suspends processing of the operation for establishing a session until the snapshot operation is performed, and resumes the processing for establishing the session based on a login request after the snapshot is performed. The replication volume may be created in the background.

In FIG. 1 shown is the storage system 1, which includes a storage apparatus 4 connected to a plurality of host apparatuses 3 (shown in FIG. 1 as host apparatuses 3a, 3b and 3c) via a network 2. Any of the host apparatuses 3 logs into the storage apparatus 4 via the network 2, and thus a session is established with a corresponding volume 411 (411a, 411b or 411c) formed on a disk device 41 of the storage apparatus 4. The established session enables the host apparatus 3 to access the volume 411. The management apparatus 5 issues a command to a controller unit 42 of the storage apparatus 4 instructing it to perform a backup of the respective volumes 411 according to a predetermined backup schedule. The terms "backup" as used herein means that the creation of a replication volume of the volume 411 (411a, 411b or 411c). In other words, the creation of the aforesaid replication volume is the ultimate goal of the backup process. The management apparatus 5 acquires the session establishment status between the respective host apparatuses 3 (3a, 3b or 3c) and the respective volumes (411a, 411b or 411c) of the storage apparatus 4 through the session management function of the controller unit 42.

Specifically, FIG. 1 shows, at a certain point in time within the backup window, a configuration, wherein (1) a status where the host apparatus 3a is logged out, (2) a status where the host apparatus 3b is once logged off but sending a login request once again, and (3) a status where the host apparatus 3c is presently using the corresponding volume 411.

Because the login session has not been established between the volume 411a and the corresponding to the host apparatus 3a and because the volume 411a is in an unused status, the controller unit 42, under the command of the management apparatus 5, creates a replication volume of the volume 411a. The volume 411b is a volume to which the host apparatus 3b is sending a login request. Therefore, the controller unit 42 performs a snapshot to acquire a snapshot image, and thereafter creates a replication volume based on the snapshot image. After creating the replication volume, the controller unit 42 establishes a session with the host apparatus 3b based on the login request. Because the volume 411c is being used by the host apparatus 3c, the management apparatus 5 does not issue a backup command to the controller 42 with respect to that volume.

Figure 2:
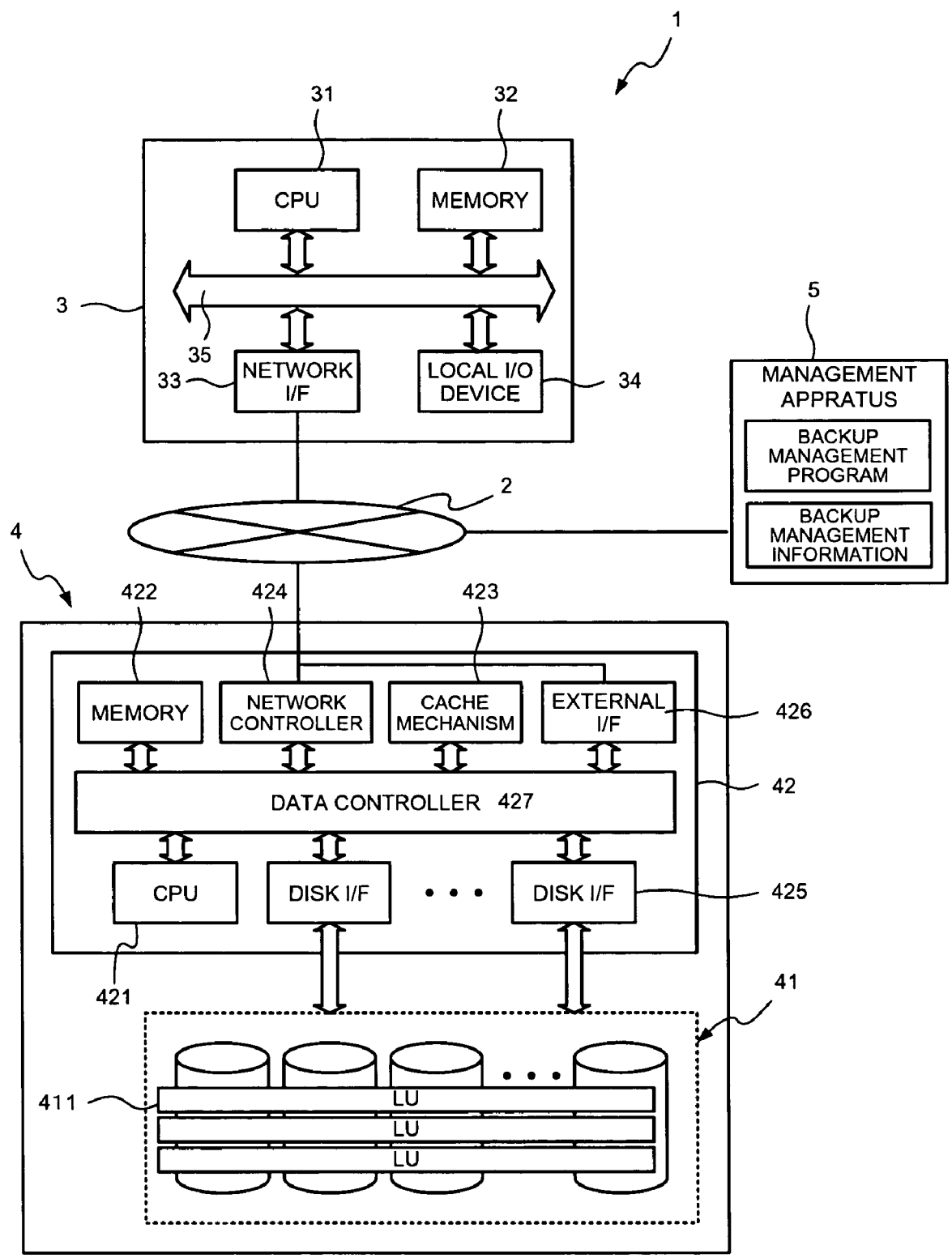
FIG. 2 is a diagram showing the configuration of the storage system according to an embodiment of the present invention.

FIG. 2 shows a configuration of the storage system 1 according to an embodiment of the present invention. As shown in FIG. 2, the storage system 1 includes the storage apparatus 4 connected to the host apparatus 3 via the network 2. In FIG. 2, although only one host apparatus 3 is shown, in the actual usage environment, a plurality of host apparatuses 3 are connected to the network 2, and the storage apparatus 4 can be accessed from such plurality of host apparatuses 3. The storage system 1 also includes the management apparatus 5 connected to the storage apparatus 2. The management apparatus 5 is a terminal device to be used by the system administrator for managing the overall storage apparatus 4.

The network 2 can be implemented, for example, using a LAN, the Internet, SAN (Storage Area Network), public line or dedicated line. Communication between the host apparatus 3 and the storage apparatus 4 via the network 2 is conducted based on a prescribed protocol. If, for example, the network 2 is a LAN or the Internet, the communication is conducted based on the TCP/IP protocol. Further, if the network 2 is a SAN, a fibre channel protocol is adopted. In the present embodiment, the network 2 is a LAN and, therefore, communication is conducted based on the TCP/IP protocol. Moreover, SCSI is known as technology for connecting the host apparatus 3 to peripheral devices such as the storage apparatus 4, and also iSCSI is known as technology for adapting SCSI to an IP network. Thus, in the present embodiment, communication between the host apparatus 3 and the storage apparatus 4 is conducted via the iSCSI based on the TCP/IP.

The host apparatus 3 is typically a general purpose personal computer or the like. The host apparatus 3 comprises hardware resources such as a CPU 31, a main memory 32, a network interface 33, and a local I/O device 34, and these components are interconnected via an internal bus 35. The host apparatus 3 also comprises software resources such as a device driver (i.e., SCSI driver), an operating system (OS), an application program and the like.

In the aforesaid configuration, the host apparatus 3, under the control of the CPU 31, executes various programs, and achieves the intended processing in interoperation with the hardware resources. The host apparatus 3 typically executes an application program on the CPU 31 under the control of the OS. An application program is a program for achieving the processing which the user wishes to perform with the host apparatus 3. Upon its execution, the application program requests the access such as the reading or writing of data to the storage apparatus 4. An initiator implemented in the host apparatus 3, based on an access request from the application program as the command, performs processing according to a network protocol so that it can be delivered to the storage apparatus 4 connected via the network 2. Further, the initiator performs processing according to a network protocol so that data read from the storage apparatus 4 and sent via the network 2 can be delivered to the application program. As described above, since the present embodiment adopts iSCSI, the initiator encapsulates the SCSI command as a PDU (Protocol Data Unit) and delivers it to a lower level referred to as a network protocol model, or converts the PDU delivered from the lower level to the SCSI command. The initiator may be designed independently from the OS, or may be incorporated as a part of the OS. Various programs may be configured as a single module, or may be configured as a plurality of modules.

The storage apparatus 4 comprises one or more disk devices 41, and a controller unit 42 configured to control the access such as reading from or writing into the disk device 41. One or more logical volumes (LU) 411 are defined on the storage extents provided by the disk device 41. The contents defining the volume 411 are retained as system configuration information in the controller unit 42. In the present embodiment, one or more volumes 411 are defined to be provided to each of the plurality of host apparatuses 3. In other words, the initiator of each host apparatus 3 is configured so that it is able to access one or more volumes 411 as the target.

A unique identifier (LUN: Logical Unit Number) is allocated to the volume 411, and the respective volumes 411 are managed by such identifier. Access to the volume LU is conducted in block units of a prescribed size. A logical block address (LBA) is further allocated to the respective blocks. Therefore, the host apparatus 3 can access the blocks of a desired volume by designating the logical address formed from an identifier and logical block address to the controller unit 42 of the storage apparatus 4.

The controller unit 42 incorporates a system circuit comprising, among other components, a CPU 421, a memory 422, and a cache mechanism 423. The controller unit 42 controls the overall I/O processing between the host apparatus 3 and the disk device 41. Further, the controller unit 42 comprises one or more network controllers 424 and one or more disk interfaces 425. Moreover, the controller unit 42 comprises an external interface 426, facilitating the connection to the management apparatus 5. These system modules are operatively connected to the data controller 427.

Figure 3:
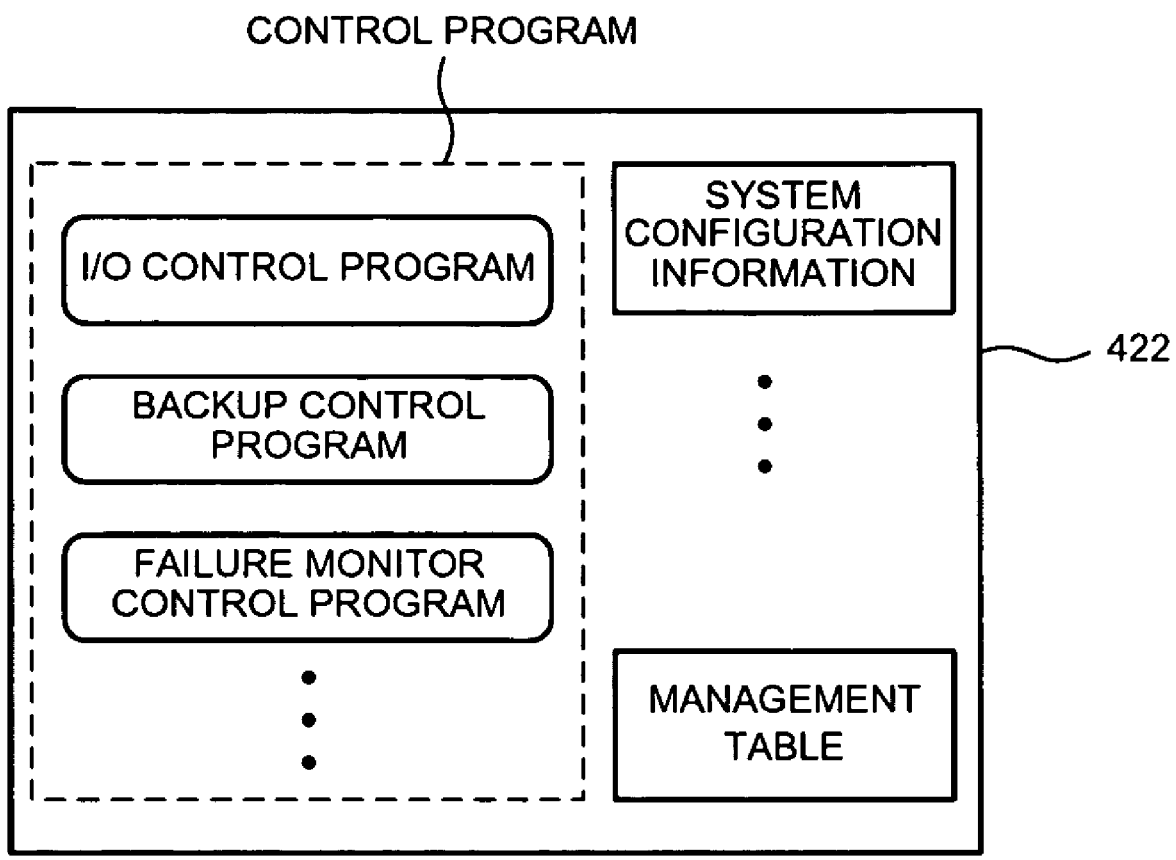
FIG. 3 is a diagram explaining the memory contents of a controller unit in the storage apparatus according to an embodiment of the present invention.

The memory 422 functions as a main memory associated with the CPU 421. As shown in FIG. 3, the memory 422 stores various control programs and profiles such as system configuration information and various types of management information utilized by the CPU 421. In the present embodiment, an I/O control program, a backup control program, a failure monitoring control program and the like are implemented as control programs. These control programs and various profiles, for example, are read from a specified volume of the disk device 41 under the control of the CPU 421 when the power of the storage apparatus 4 is turned on, and subsequently deployed within the memory 422. Alternatively, if the memory 422 is configured to include a rewritable nonvolatile memory, the control programs and various profiles may be permanently retained within the nonvolatile memory and read therefrom.

Returning to FIG. 2, the cache mechanism 423 comprises a cache memory, and is used for temporarily storing the I/O data between the host apparatus 3 and the disk device 41. In other words, a command sent from the host apparatus 3 is once stored in the cache memory, and the data read from the disk device 41 is once retained in the cache memory upon transferring such data to the host apparatus 3.

Figure 4:
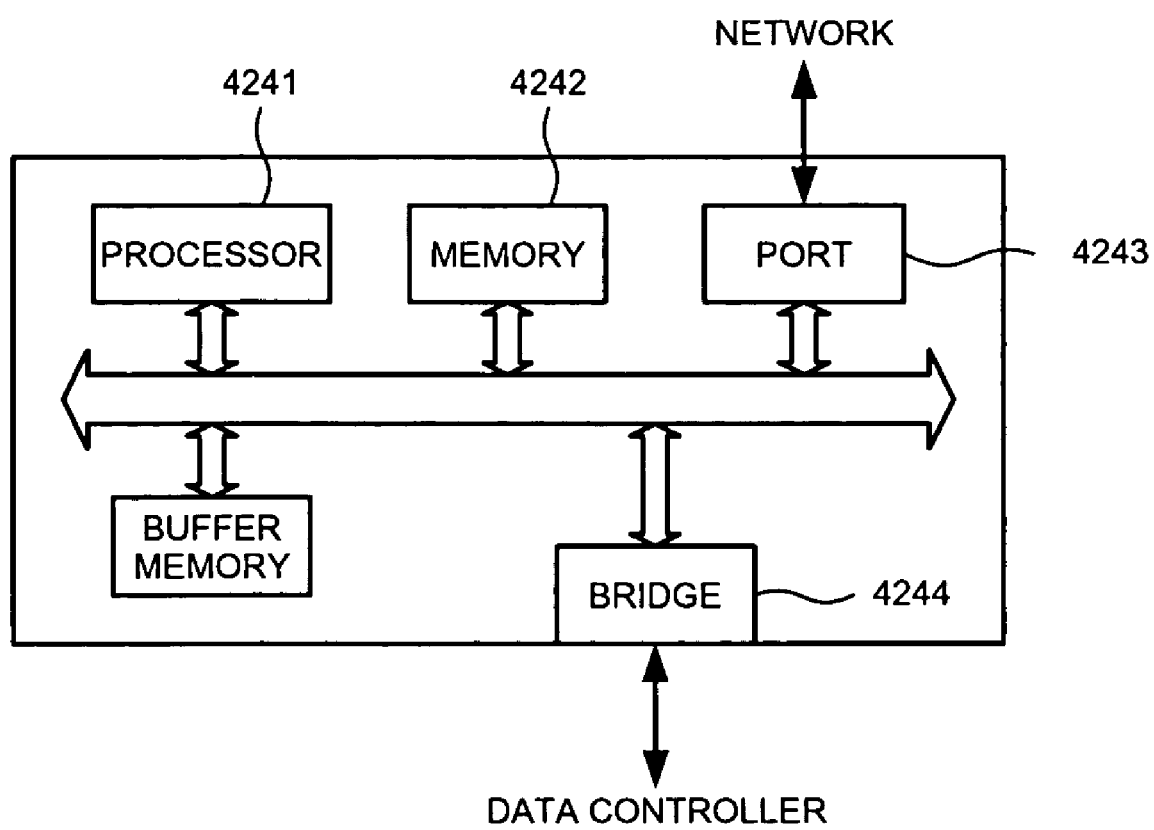
FIG. 4 is a diagram showing the configuration of a network controller in the storage apparatus according to an embodiment of the present invention.
Figure 5:
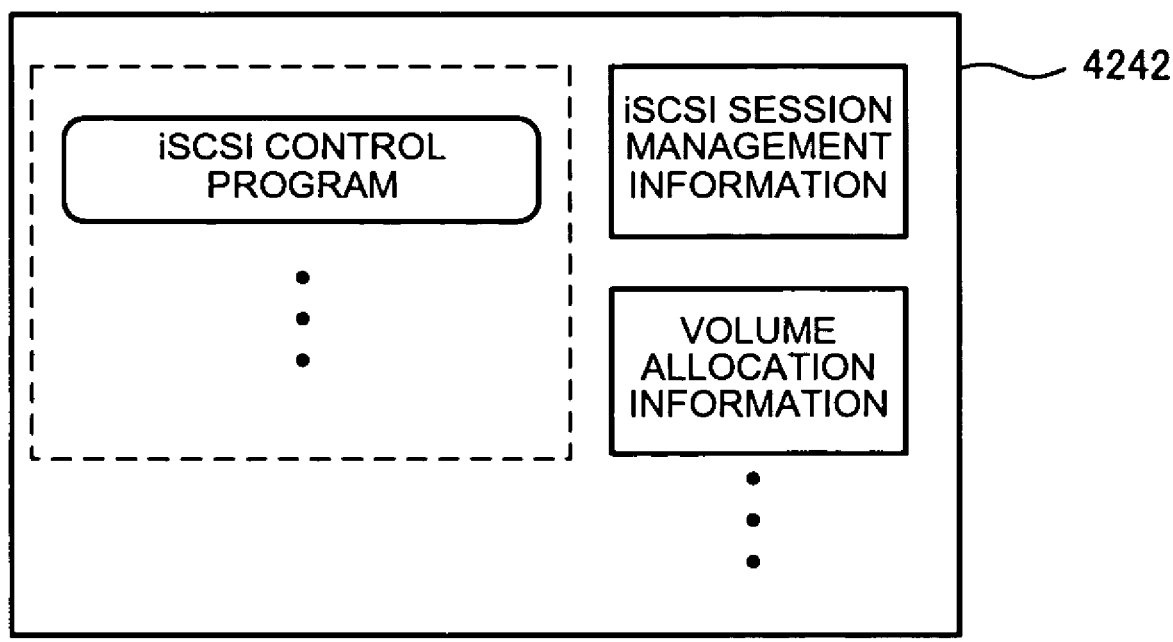
FIG. 5 is a diagram explaining the memory contents of a network controller in the storage apparatus according to an embodiment of the present invention.

The network controller 424 is a system circuit configured to communicate with the host apparatus 3 via the network 2. FIG. 4 is a diagram showing a configuration of the network controller 424 in the storage apparatus according to an embodiment of the present invention. As shown in FIG. 4, the network controller 424 comprises a processor 4241, a memory 4242, a port 4243, and a bridge 4245. The processor 4241 executes a control program stored in the memory 4242. The memory 4242, as shown in FIG. 5, retains various types of management information required in executing the control program. The iSCSI control program is a program that forms a pair with the initiator of the host apparatus 3. The iSCSI control program refers to the volume allocation information, and recognizes which initiator is allocated to which volume. Further, the iSCSI session management information retains the establishment status of the respective sessions of iSCSI. The network controller 424 uses the iSCSI session management information to provide the session management function shown in FIG. 1. Details regarding the volume allocation information and the iSCSI session management information will be described later.

A network address is allocated to the port 4243, and, therefore, the respective network controllers 424 are uniquely identified within the network 2. The network controller 424 receives packet data sent from the host apparatus 3 via the network 2, and, after extracting a command according to the network protocol, it delivers the packet data to the control of the CPU 421 of the controller unit 42 via the bridge 4245.

Referring back to FIG. 2, the disk interface 425 provides the I/O interfacing capability to the disk device 41. Typically, one disk device is connected to one disk interface 425.

The external interface 426 is provided for connecting the storage apparatus 4 to the management apparatus 5, which manages the overall operation of the storage apparatus 4. In the present embodiment, although the management apparatus 5 is connected to the storage apparatus 4 via the network 2, using the external interface 426, the management apparatus 5 may also be directly connected to the storage apparatus 4 via a dedicated line. Further, in the present embodiment, although the management apparatus 5 is externally connected to the storage apparatus 4, similar functionality may be implemented using an integrated service processor (SVP) and a user interface provided by the storage apparatus 4.

As described above, the management apparatus 5 is a terminal device for managing the overall operation of the storage apparatus 4, and, although a general purpose computer is typically used, a specialized control terminal may also be used for this purpose. The management apparatus 5, as well as the host apparatus 3, realizes necessary processing for managing various aspects of operation of the storage apparatus 4, based on the interoperation of the hardware resources and the software resources under the control of the processor. The management apparatus 5, for instance, is loaded with a backup management program and backup management information, and performs processing associated with the backup of the storage apparatus 4. The management apparatus 5 provides a user interface to the system administrator for setting the backup schedule, and further refers to the backup management information according to the set backup schedule and issues a command to the controller unit 42 so that the backup processing is performed with respect to the volume to be backed up. In one embodiment, the backup management information is formatted in a tabular format indicating whether the backup processing has been performed on the respective volumes. Further, in this embodiment, the management apparatus 5 monitors the operation of the network controller 424 according to the backup schedule, and issues a backup command when it detects a prescribed event such as a login or logout request according to the iSCSI protocol is made to the specific volume.

FIG. 6 is a diagram showing volume allocation information according to an embodiment of the present invention. The volume allocation information, as described above, is retained in the memory 4242 of the network controller 424, and defines the relationship of the initiator loaded in the respective host apparatuses 3 and the respective volumes in the storage apparatus 4. Because the initiator may exist as a plurality of execution instances in the host apparatus 3, the host apparatus 3 and the volume could form a one-to-many relationship.

As shown in FIG. 6, the volume allocation information is configured from the fields of "volume name," "allocation size," "target name," and "initiator name." The "target name" is the name of the iSCSI target to which the volume targeted by the initiator is allocated. The initiator, by designating the target name, accesses the volume in the disk device 41.

FIG. 7 is a diagram showing session management information according to an embodiment of the present invention. The session management information is also retained in the memory 4242 of the network controller 424, and manages the establishment status of each iSCSI session. As shown in FIG. 7, for example, the iSCSI session corresponding to the initiator "initiator #1001" and the volume "Volume #1001" is in "OFF" state, that is, the user of the host apparatus 3 using the volume "Volume #1001" is not logged in. Further, because the iSCSI session of the initiator "initiator #1002" and the volume "Volume #1002" is in "ON" state, this shows that the user of the host apparatus 3 is logged in to use the volume "Volume #1002." The management apparatus 5 refers to the session management information according to the backup schedule, and issues a command to the controller unit 42 such that backup is performed on volumes, which the iSCSI session status as "OFF."

FIGS. 8A-8C are diagrams showing a backup management information according to an embodiment of the present invention. The backup management information is stored in a table for managing the backup processing status of the volume 411, and is retained in the memory of the management apparatus 5. FIGS. 8A-8C show the backup processing statuses of the volume 411 at a certain point in time within the backup window. The backup processing status is defined with "Online," "Ready," "Done," "Done(ss)," and "Error."

The status "Online" indicates that the volume is being used, and, therefore, the replication volume of such volume has not been created. Further, the status "Ready" indicates that the volume is not being used, but the replication volume of such volume has not been created. Moreover, the status "Done" indicates that the replication volume has been created, and the status "Done(ss)" indicates that a snapshot image has been acquired but the replication volume has not been created. As described above, in the present embodiment, since the ultimate target of backup is to create a replication volume, the process of backup processing is defined with two statuses (i.e., "Done" and "Done(ss)").

As the backup schedule, for example, if backup processing is set to start at 0:00 A.M., the status will be either "Online" or "Ready."

Figure 9:
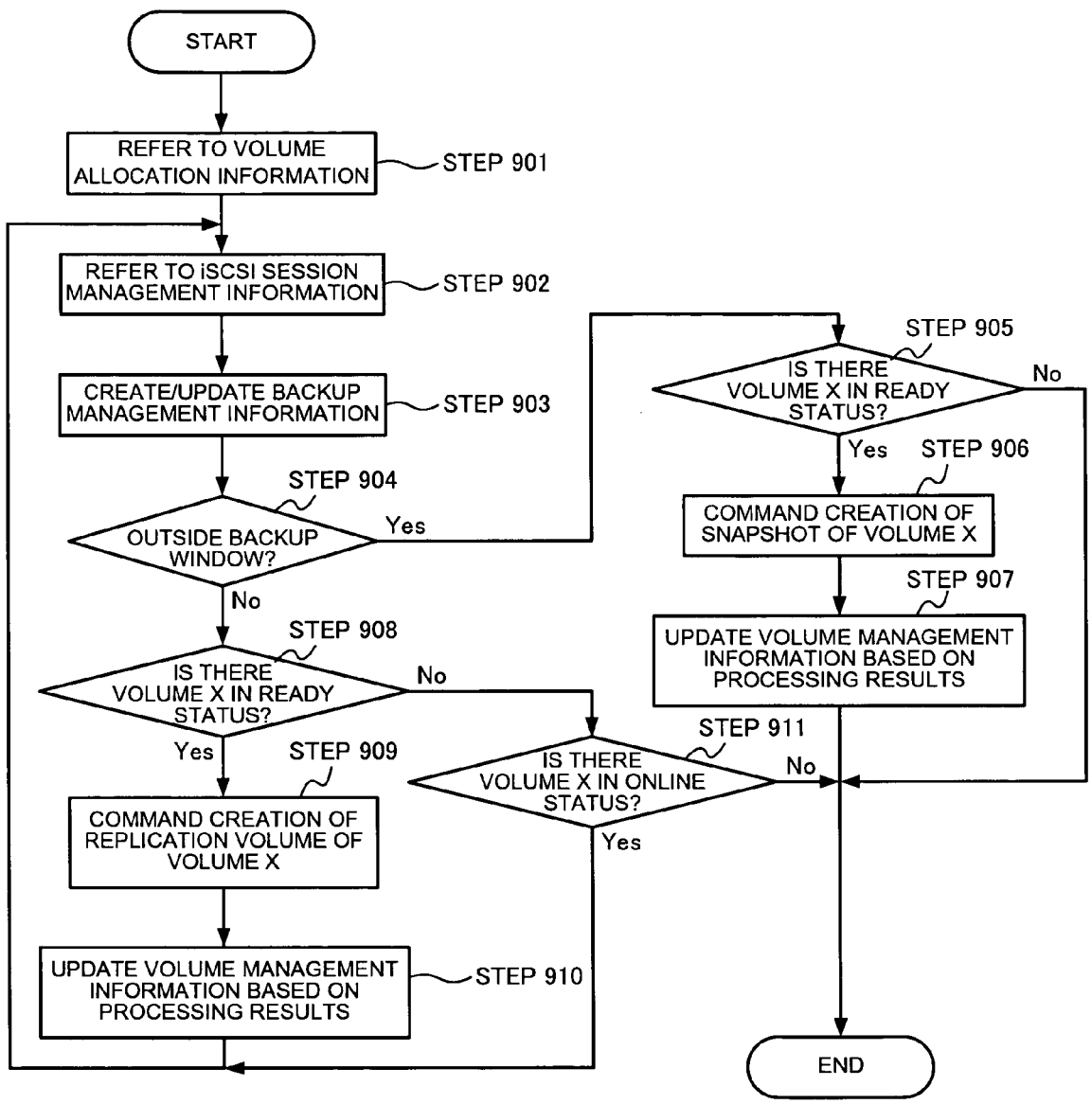
FIG. 9 is a flowchart showing the management of backup processing in a management apparatus according to an embodiment of the present invention.

FIG. 9 is a flowchart showing the management of backup processing in the management apparatus 5 according to an embodiment of the present invention. The management apparatus 5 performs the management of backup processing shown in FIG. 9 by executing the backup management program.

Specifically, the management apparatus 5 refers to the volume allocation information in the network controller 424, and acquires the allocation information of the volume 411 (STEP 901). In the present embodiment, since the management apparatus 5 is connected to an external Interface (I/F), it acquires allocation information from the network controller 424 via the data controller 427. As a result of the acquisition of the allocation information, the management apparatus 5 recognizes the association of the respective volumes 411 with the iSCSI session. Subsequently, the management apparatus 5 refers to the iSCSI session management information stored in its own memory, and acquires the session establishment status (STEP 902). The management apparatus 5 updates the backup management information based on the acquired volume allocation information and session establishment status (STEP 903). Specifically, if the session establishment status is "ON," the corresponding volume status of the backup management information will be changed to "Online," and, if it is "OFF," it will be changed to "Ready." When the backup management information has not yet been created such as immediately after the initialization of the controller unit 42 of the storage apparatus 4, the management apparatus 5 may create a new backup management information. Further, as described above, immediately prior to starting the backup processing, status of the backup management information may be either "Online" or "Ready."

Subsequently, the management apparatus 5 determines whether the current processing is outside the backup window (STEP 904). This is conducted, for example, by way of comparing the time reading of the timer built within the management apparatus 5 and the corresponding entry of the backup schedule. As is apparent from the above, the backup management program is executed not only within the backup window, but may be suitably executed with a system resident program or the like.

When the management apparatus 5 determines that the current processing is outside the backup window (STEP 904; "Yes"), it refers to the backup management information, and searches for a volume 411(X) in which the status is "Ready" (STEP 905). When the management apparatus 5 extracts a volume 411(X) in which the status is "Ready" (STEP 905; "Yes"), it issues a command to the controller unit 42 so as to perform a snapshot to such volume 411(X) and acquires a snapshot image (STEP 906). In the foregoing case, although the management apparatus 5 may also issue a command of creating a replication volume, since there is a possibility that the volume 411(X) could be used outside the backup window, in the present embodiment, a command is issued for performing a snapshot. The controller unit 42, according to the command from the management apparatus 5, performs a snapshot and creates a snapshot image. It would be understood that a snapshot image is typically a volume of metadata configured from hard link information or the like to actual data in the volume 411. When there is additional update of data in the volume 411 subject to the snapshot, the controller unit 42, for example, as shown in FIG. 10, manages such update information using a bitmap table.

After requesting the creation of a snapshot, the management apparatus 5 updates the backup management information based on a processing result report sent from the controller unit 42 (STEP 907). In other words, the status of the volume 411(X) to be subject to a snapshot will become "Done(ss)" or "Error." "Error," for example, shows that a snapshot image could not be normally acquired due to a login during the acquisition of the snapshot image or because of other reasons.

In contrast, when the current processing is determined to be within the backup window at STEP 904 (STEP 904; "No"), the management apparatus 5 refers to the backup management information, and searches for a volume 411(X) having the status "Ready" (STEP 908). When the management apparatus 5 extracts a volume 411(X) in which the status is "Ready" (STEP 908; "Yes"), it issues a command to the controller unit 42 to create a replication volume of the volume 411(X) (STEP 909). As described later, the controller unit 42 foremost performs a snapshot of the volume 411(X) based on the command, and thereafter creates a replication volume based on the snapshot image. The management apparatus 5 subsequently updates the backup management information based on the processing result report sent from the controller unit 42 (STEP 910). Accordingly, the status of the volume 411(X) to be subject to a snapshot will become "Done," "Done(ss)," or "Error."

When there is no volume 411(X) in which the status is "Ready" (STEP 908; "No"), the management apparatus 5 further checks whether there is a volume 411(X) in which the status is "Online" (STEP 911). When there is a volume 411(X) in which the status is "Online" (STEP 911; "Yes"), the management apparatus 5 returns to STEP 902 to continue performing the backup processing.

By managing the backup processing as described above, the backup management information shown in FIG. 8A can be obtained at a certain point in time. Further, the backup management information will be updated in sequence as shown in FIGS. 8B and 8C, based on the lapsed time.

Figure 11:
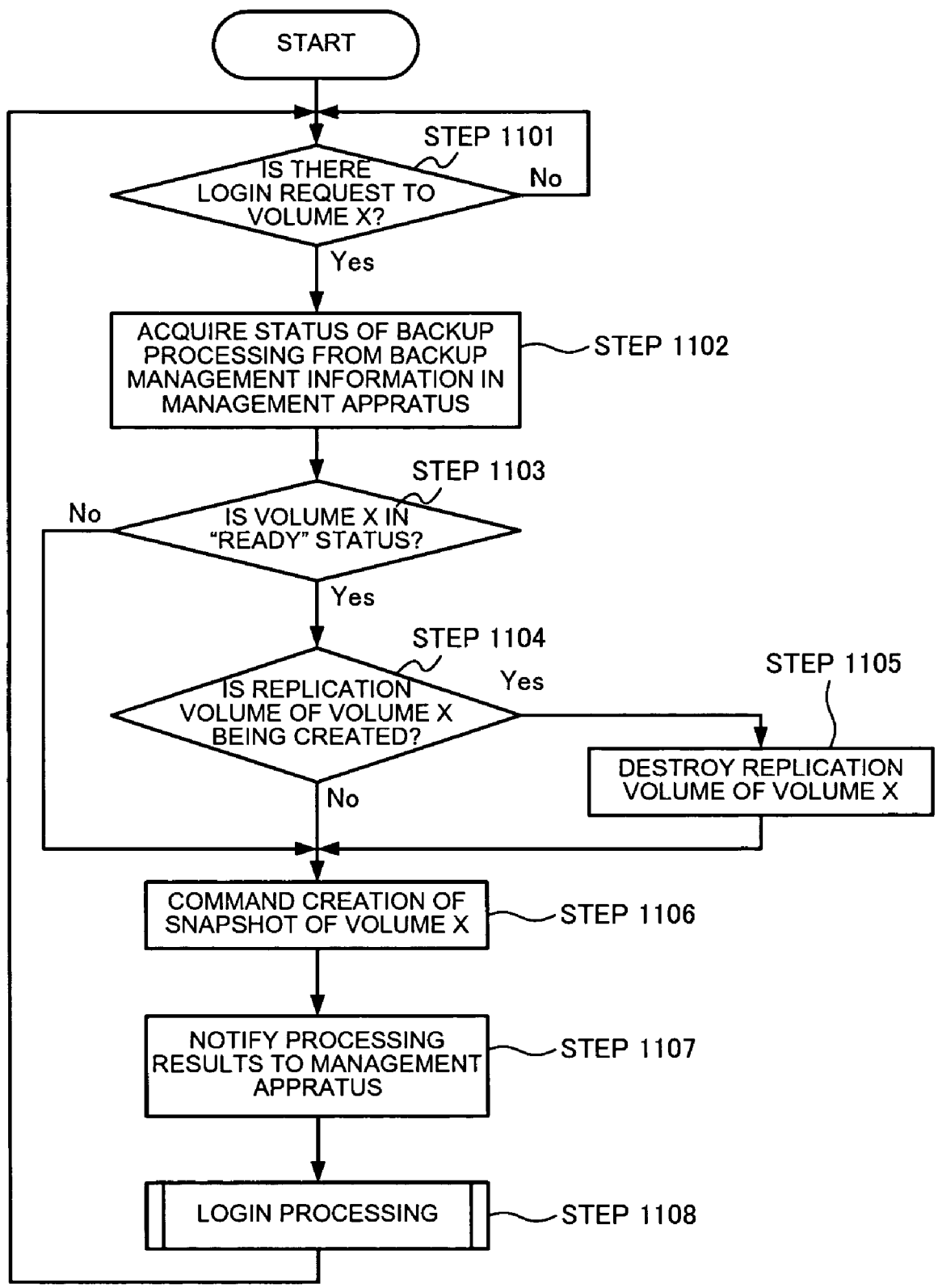
FIG. 11 is a flowchart showing backup processing in the storage apparatus according to an embodiment of the present invention.

FIG. 11 is a flowchart showing the backup processing in the storage apparatus 5 according to an embodiment of the present invention. FIG. 11 shows the backup processing at the point in time when a login request is made from the host apparatus 3 to the volume 411 in the storage apparatus 4.

As shown in FIG. 11, when the storage apparatus 4 receives a login request directed to the volume 411(X) from the initiator of the host apparatus 3 (STEP 1101), it refers to the backup management information in the management apparatus 5, acquires the backup processing status of the volume 411(X) (STEP 1102), and checks whether the status of the volume 411(X) is "Ready" (STEP 1103). As described above, the status "Ready" indicates that the volume is not being used, and the replication volume corresponding thereto has not been created.

When the storage apparatus 4 determines that the status of the volume 411(X) is "Ready" (STEP 1103; "Yes"), it subsequently checks whether a replication volume corresponding to the volume 411(X) is being currently created (STEP 1104). This is because the creation of the replication volume requires a considerable amount of time, and, even if the status is "Ready," there may be cases where the contents of the backup management information are not reflected due to temporal variations until the creation is complete. When the replication volume of the volume 411(X) is being created (STEP 1104; "Yes"), the storage apparatus 4 discontinues the creation of the replication volume of the volume 411(X) from the perspective of data consistency, and destroys or deletes the replication volume (STEP 1105). The term "destruction" or "deletion" is used in a broad sense that the replication volume that is being created regarding the volume 411(X) will not be used.

When the creation of the replication volume of the volume 411(X) has not been started (STEP 1104; "No"), the storage apparatus 4 performs a snapshot of the volume 411(X) and acquires a snapshot image (STEP 1106), and thereafter notifies the management apparatus 5 of the result of backup processing (STEP 1107). The management apparatus 5 receives this notification and updates the contents of the backup management information. Accordingly, the status of the volume 411(X) in the backup management information is updated to "Done(ss)." Subsequently, the storage apparatus 4 performs sequential processing regarding the login request, and establishes a session with the host apparatus 3 (STEP 1108).

As discussed above, although the storage apparatus 4 uses a login request from the host apparatus 3 as a trigger for the backup processing, since a snapshot is performed without directly creating a replication volume to the volume 411 with a login request, it is possible to respond to the login request within a range of not causing an inconvenience to users such as excessive waiting time for the login processing.

Figure 12:
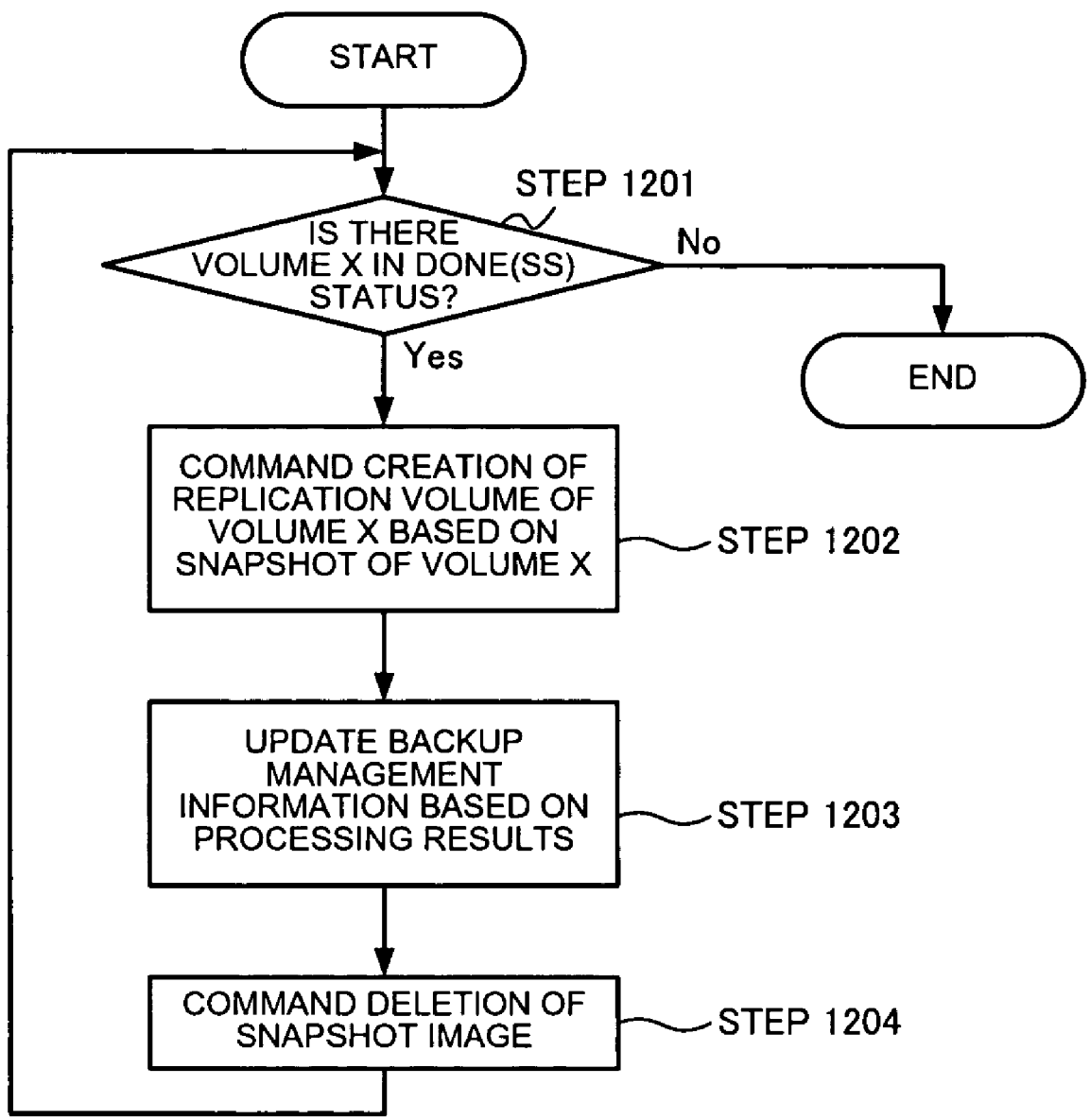
FIG. 12 is a flowchart showing backup management in a management apparatus according to an embodiment of the present invention.

FIG. 12 is a flowchart showing the backup management with the management apparatus 5 according to an embodiment of the present invention. When there is a replication volume that has not been completely subject to backup processing; that is, when there is a volume 411 in which the creation of the replication volume is not complete, the management apparatus 5 issues a command to the storage apparatus 4 to create a replication volume. FIG. 12 shows the backup management to a volume 411 at the stage where a snapshot is performed.

As shown in FIG. 12, the management apparatus 5 refers to the volume allocation information, and determines whether there is a volume 411(X) having the backup processing status as "Done(ss)" (STEP 1201). When there is a volume 411(X) in which the backup processing status is "Done(ss)", the management apparatus 5 issues a command to the storage apparatus 4 to create a replication volume of the volume 411(X) (STEP 1202). Thus, the storage apparatus 4 starts creating the replication volume based on the acquired snapshot image of the volume 411(X). The management apparatus 5 updates the contents of the backup management information based on the processing result notified from the storage apparatus 4 (STEP 1203). Accordingly, the status of the volume 411(X) in the backup management information is updated to "Done." Then, because the snapshot image of the volume 411(X) is not required, the management apparatus 5 issues a command to the storage apparatus 4 to delete the snapshot image (STEP 1204).

Figure 13:
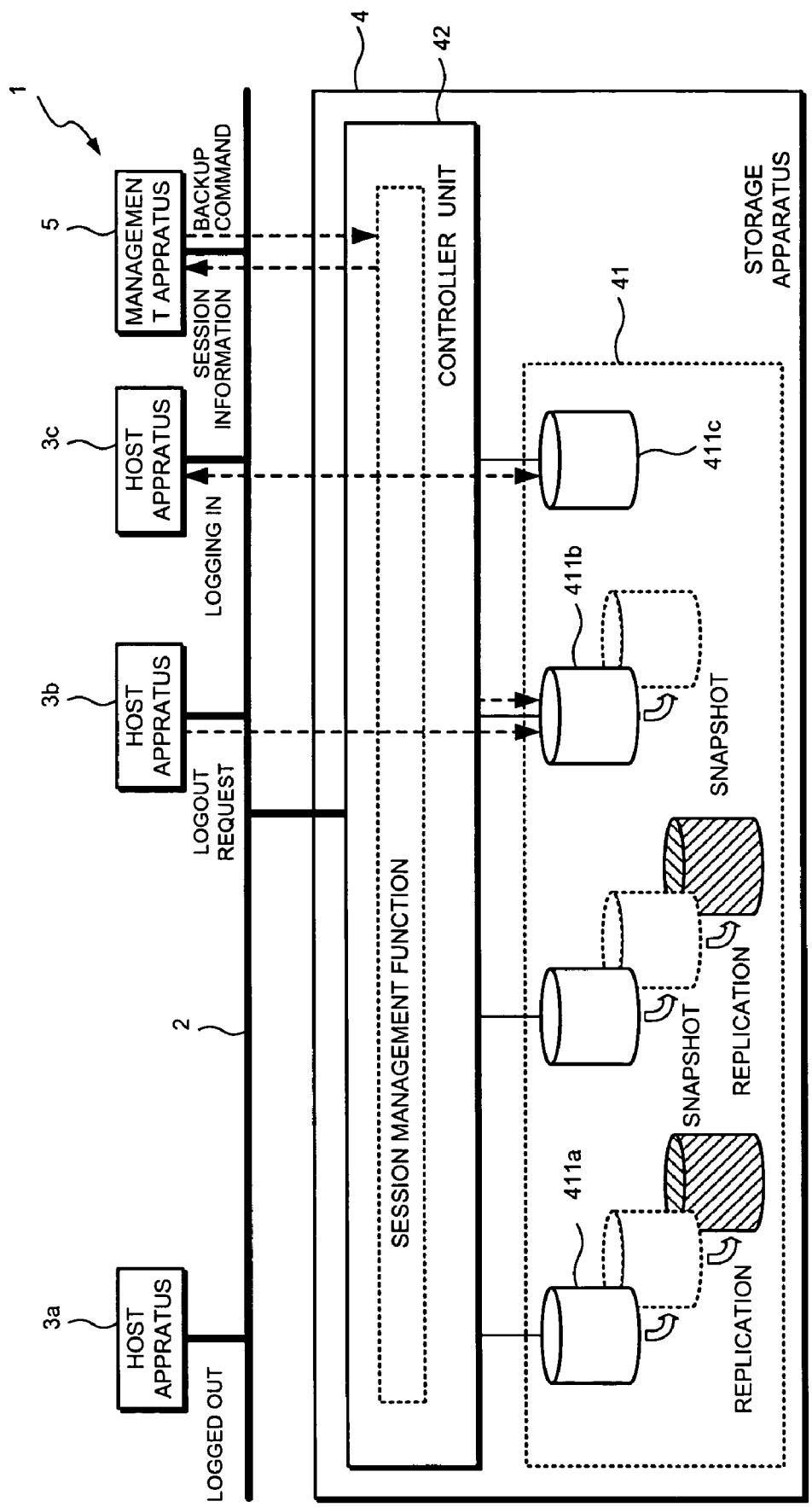
FIG. 13 is a conceptual diagram explaining data backup processing in the storage system according to an embodiment of the present invention.

Another embodiment of the present invention will now be explained. FIG. 13 is a conceptual diagram explaining data backup processing in the storage system according to another embodiment of the present invention.

In this present embodiment, to preserve data consistency, when there is a logoff request, a snapshot image is acquired immediately, and a replication volume is subsequently created based on the snapshot image in the background processing.

As FIG. 13 shows, at a certain point in time within the backup window, (1) a status where the host apparatus 3a is logged out, (2) a status where the host apparatus 3b is once logged off but sending a login request once again, and (3) a status where the host apparatus 3c is ongoingly using the corresponding volume 411.

Because the volume 411a corresponding to the host apparatus 3a has not been logged in by the host apparatus 3a and is in an unused status, the controller unit 42, under the command of the management apparatus 5, creates a replication volume of the volume 411a. The volume 411b is a volume in which the host apparatus 3b is sending a logoff request. Therefore, the controller unit 42, under the command of the management apparatus 5, performs a snapshot to acquire a snapshot image, and thereafter creates a replication volume based on the snapshot image. Because the volume 411c is being used by the host apparatus 3c, the management apparatus 5 does not issue a backup command to the controller 42 with respect to that volume.

Figure 14:
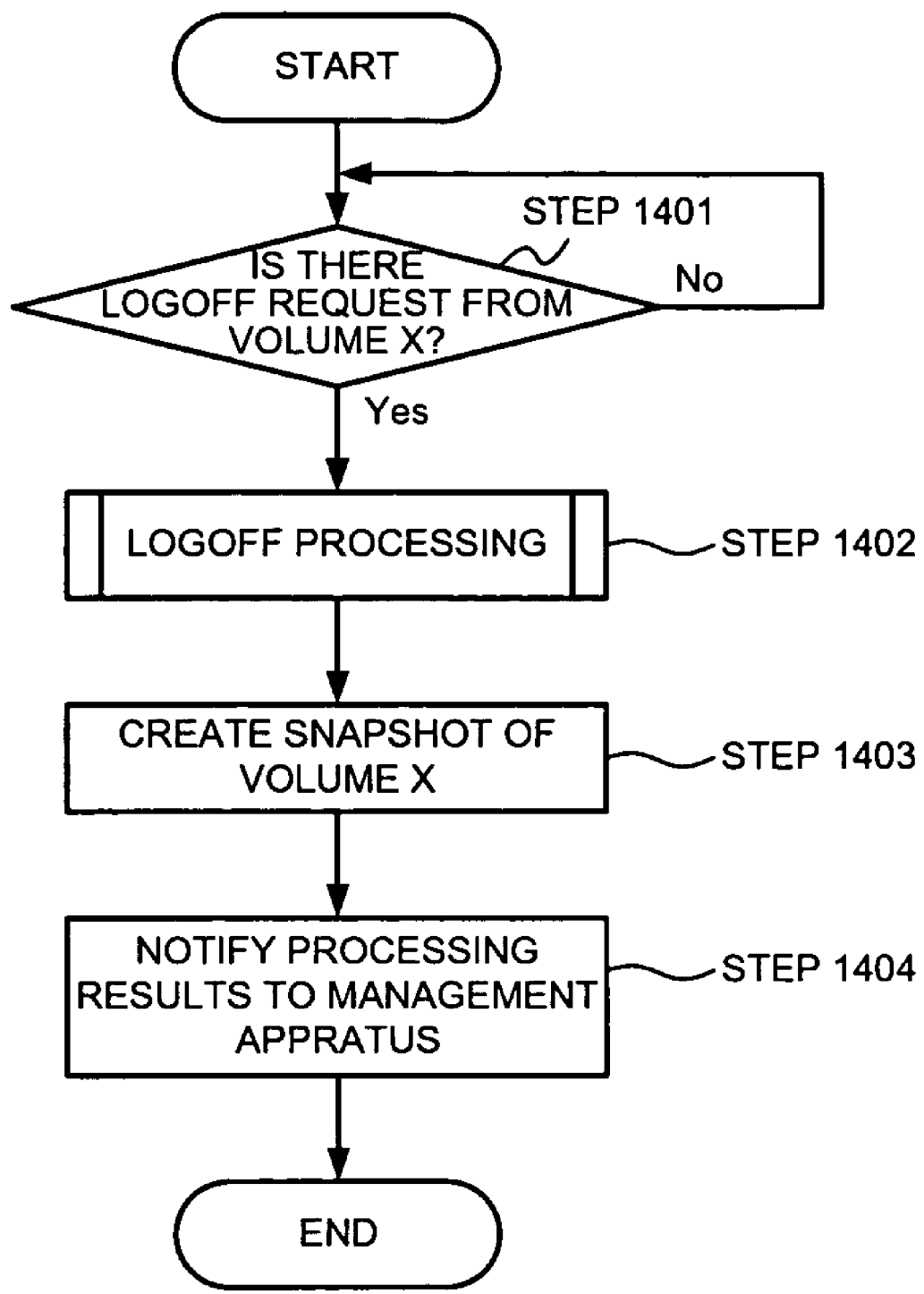
FIG. 14 is a flowchart showing backup processing in the storage apparatus according to an embodiment of the present invention.

FIG. 14 is a flowchart showing backup processing in the storage apparatus 4 according to an embodiment of the present invention. FIG. 14 shows the backup processing at the point in time when a logoff request is given from the host apparatus 3 to the volume 411 in the storage apparatus 4.

Referring to FIG. 14, when the storage apparatus 4 receives a logoff request to the volume 411(X) from the initiator of the host apparatus 3 (STEP 1401), it performs sequential processing relating to the logoff request and disconnects (terminates) the session with the host apparatus 3 (STEP 1402).

After the storage apparatus 4 terminates the session, it immediately performs a snapshot of the volume 411(X) to acquire a snapshot image (STEP 1403), and then notifies the management apparatus 5 of the backup processing result (STEP 1404). The management apparatus 5 receives this notice and updates the contents of the backup management information. Accordingly, the status of the volume 411(X) in the backup management information is updated to "Done(ss)."

As discussed above, although the storage apparatus 4 uses a logoff request from the host apparatus 3 as a trigger for the backup processing, by directly performing a snapshot of the volume 411 subject to a logoff request, it will suffice to create a replication volume corresponding to the volume 411 subject to a snapshot in the subsequent background processing.

Figure 15:
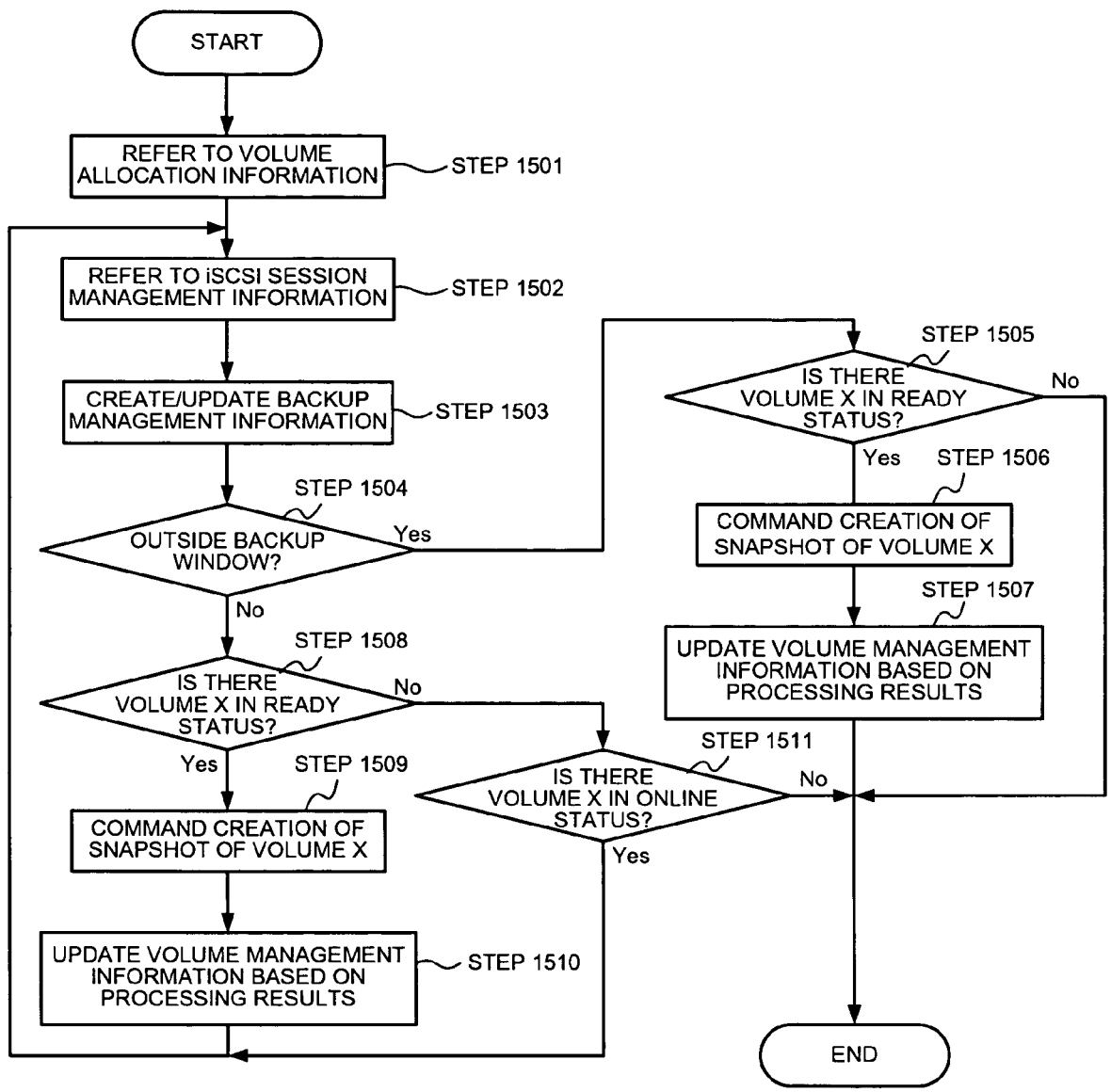
FIG. 15 is a flowchart showing backup management in a management apparatus according to an embodiment of the present invention.

FIG. 15 is a flowchart showing the management of backup processing in the management apparatus 5 according to an embodiment of the present invention. FIG. 15 corresponds to FIG. 9 in the foregoing embodiment, but differs in that a snapshot is performed instead of creating a replication volume of the volume 411(X) in which the status within the backup window is "Ready" (FIG. 15; STEP 1509).

Specifically, as shown in FIG. 15, the management apparatus 5 refers to the volume allocation information in the network controller 424, and acquires the allocation of the volume 411 (STEP 1501). Subsequently, the management apparatus 5 refers to the iSCSI session management information stored in its own memory, and acquires the session establishment status (STEP 1502). The management apparatus 5 updates the backup management information based on the acquired volume allocation information and session establishment status (STEP 1503).

After that, the management apparatus 5 determines whether the current processing is outside of the backup window (STEP 1504). For example, this is conducted by comparing the reading of a timer built into the management apparatus 5 and the corresponding value in the backup schedule.

When the management apparatus 5 determines that the current processing is outside the backup window (STEP 1504; "Yes"), it refers to the backup management information, and searches for a volume 411(X) in which the status is "Ready" (STEP 1505). When the management apparatus 5 extracts a volume 411(X) in which the status is "Ready" (STEP 1505; "Yes"), it issues a command to the controller unit 42 to perform a snapshot to such volume 411(X) and acquires a snapshot image (STEP 1506). After commanding the creation of a snapshot, the management apparatus 5 updates the backup management information based on a processing result report sent from the controller unit 42 (STEP 1507). Accordingly, the status of the volume 411(X) to be subject to a snapshot will become "Done(ss)" or "Error."

In contrast, when the current processing is determined to be within the backup window at STEP 1504 (STEP 1504; "No"), the management apparatus 5 refers to the backup management information, and searches for a volume 411(X) having the "Ready" status (STEP 1508). When the management apparatus 5 extracts a volume 411(X) in which the status is "Ready" (STEP 1508; "Yes"), it issues a command to the controller unit 42 to perform a snapshot and acquire a snapshot image of the volume 411(X) (STEP 1509). As described herein below, the controller unit 42 first performs a snapshot of the volume 411(X) based on the received command, and thereafter creates a replication volume based on the snapshot image. The management apparatus 5 subsequently updates the backup management information based on the processing result report sent from the controller unit 42 (STEP 1510). Accordingly, the status of the volume 411(X), having the snapshot thereof taken, will become "Done(ss)" or "Error".

When there is no volume 411(X) in which the status is "Ready" (STEP 1508; "No"), the management apparatus 5 further checks whether there is a volume 411(X) in which the status is "Online" (STEP 1511). When there is a volume 411(X) in which the status is "Online" (STEP 1511; "Yes"), the management apparatus 5 returns to STEP 1502 to continue performing the backup processing.

The foregoing embodiments are mere exemplifications for explaining the present invention, and are not intended to limit the present invention in any way. The present invention may be implemented in various modes so as long as the implementation does not deviate from the gist hereof. For example, although various processing routines and operations were explained sequentially, the present invention is not limited thereto. Thus, so as long as there is no inconsistency in the operation, the present invention may be configured so that the processing order is switched or processing is performed in parallel.

Figure 16:
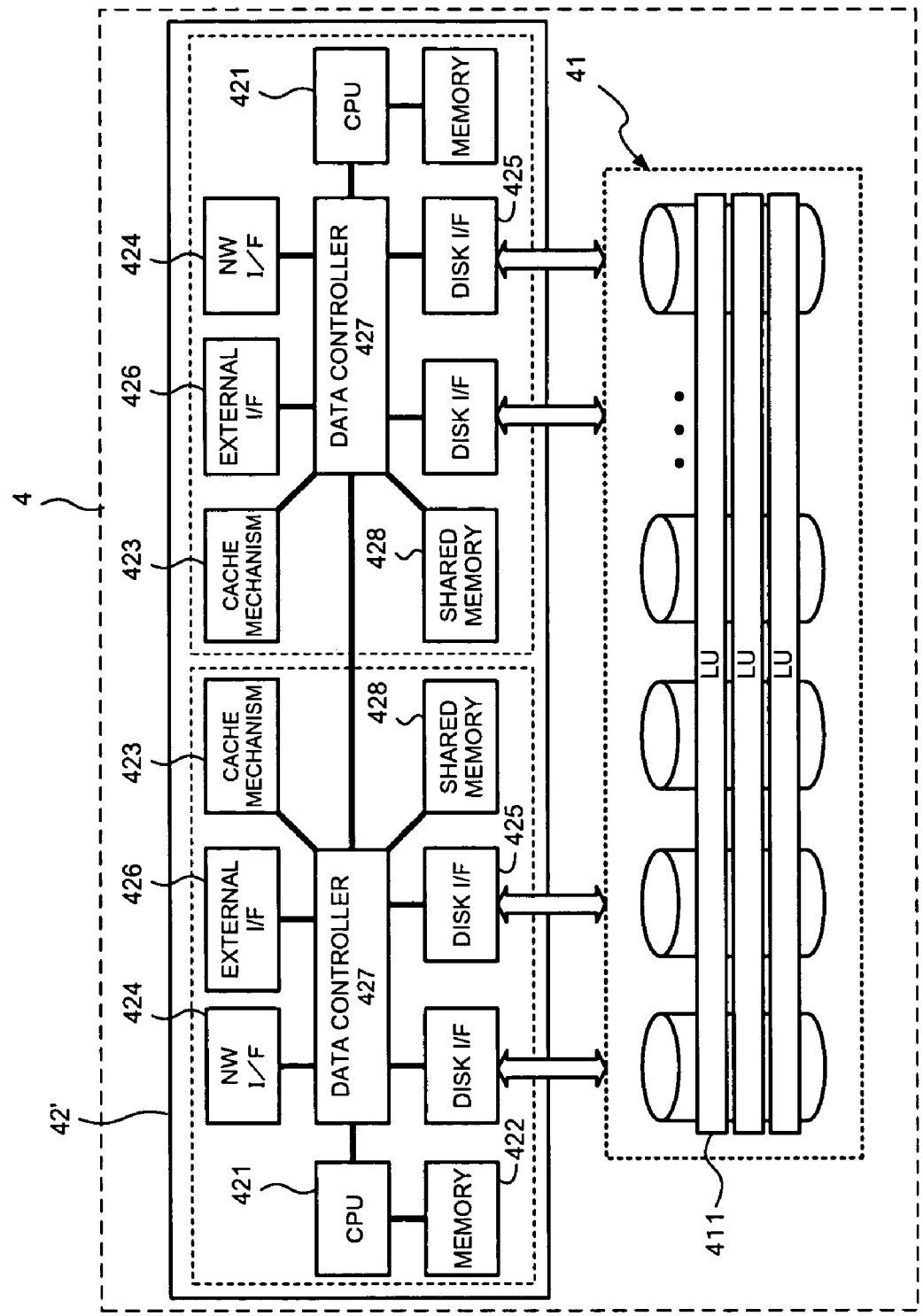
FIG. 16 is a diagram showing a configuration of the storage apparatus according to an embodiment of the present invention.

Further, the storage apparatus 4 pertaining to the foregoing embodiment may also be configured by including a dual controller unit. FIG. 16 is a diagram showing a configuration of the storage apparatus 4 according to an embodiment of the present invention. As shown in FIG. 16, the storage apparatus 4 contains a controller unit 42' comprising a dual path for preventing the system from going down due to failure or the like. Accordingly, the controller unit 42' is configured by duplicating the system circuit of the controller unit 42 shown in FIG. 2, and connecting the duplicated system circuits such as to enable internal interoperation thereof.

Figure 17A:
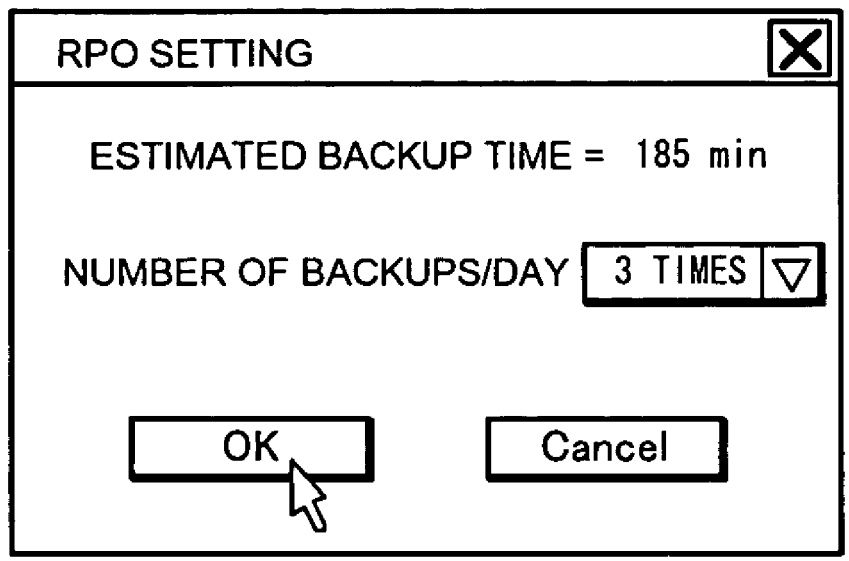
FIGS. 17A and 17B are diagrams showing an example of the user interface provided by the management apparatus 5 according to an embodiment of the present invention.
Figure 17B:
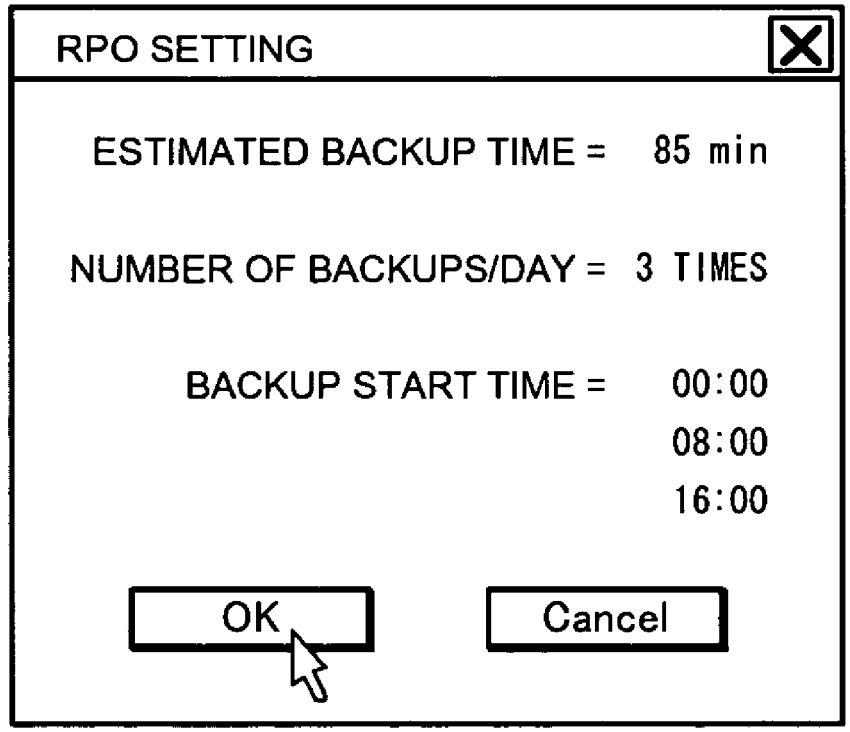
Figure 18A:
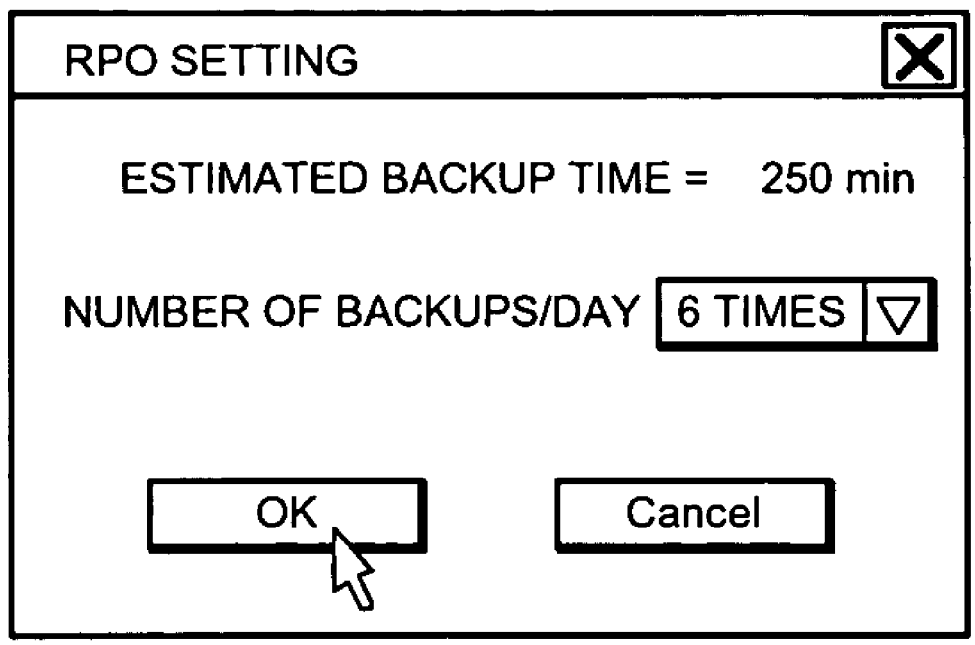
FIGS. 18A and 18B are diagrams showing an example of the user interface provided by the management apparatus 5 according to an embodiment of the present invention.

Moreover, in the foregoing embodiments, although an explanation was provided on the premise that the Recovery Point Objective (RPO) is a fixed value of one day, the RPO may be dynamically calculated and decided based on the storage capacity (volume capacity) of the disk device 41 and processing performance, and various parameters such as the frequency of writing requests. In addition, the system administrator may also use the management apparatus 5 and freely set the RPO. FIG. 17 and FIG. 18 are diagram showing an example of the user interface provided by the management apparatus 5 according to an embodiment of the present invention. The management apparatus 5 prompts the system administrator to set the RPO via this kind of user interface.

Figure 18B:
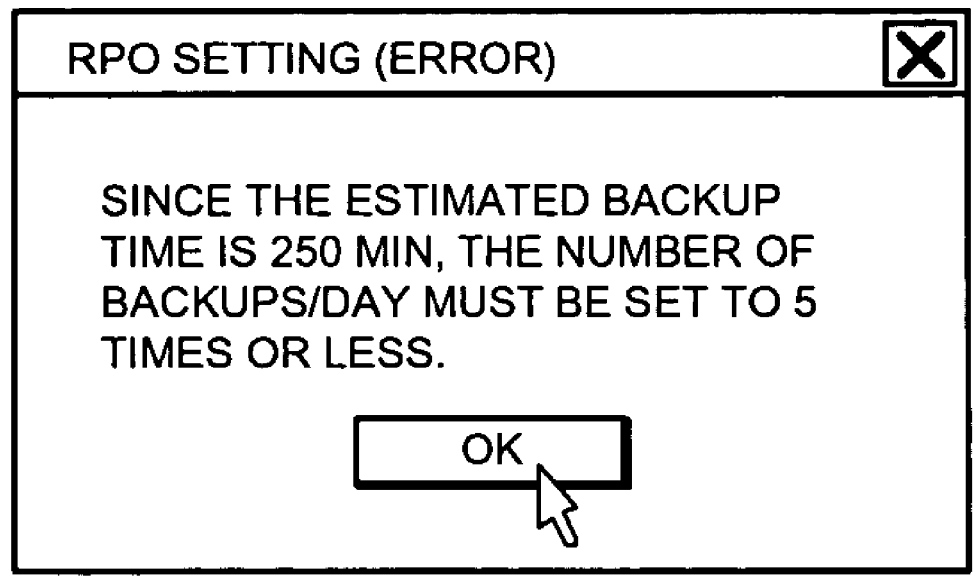

The management apparatus 5, for example, calculates backup estimated time Tb1 based on the time required for the backup of all backup volumes, from the start to the end. Further, the management apparatus 5 may additionally calculate the backup estimate time Tb2 based on the statistical value of the period based on the backup estimated time Tb1. Moreover, the management apparatus 5 may also calculate backup estimate time Tb3 which is actually required from the processing performance (for instance, specification such as 1000IOPS at 512 kb) and the total capacity of volumes based on the input setting value. The management apparatus 5 presents one of these backup estimate times Tb1 to Tb3 to the system administrator, and prompt the input of the number of backups to be performed per day. The management apparatus 5 checks whether there is any inconsistency in the setting value input by the system administrator, displays an error dialog when such inconsistency is detected, and prompts the reentry of an inconsistent setting value (FIG. 18B). Further, in the foregoing embodiments, although the iSCSI is adopted within TCP/IP, the present invention is not limited only to such implementation. The present invention merely needs to be able to trigger the generation of a prescribed event such as a login or logoff request. For example, the present invention may also be configured by performing backup processing based on re-authentication processing in the FC (Fibre Channel) technology.

Further, in the present embodiment, although the management apparatus 5 was managing the backup processing, the controller unit 42 of the storage apparatus 4 may be loaded with a function that is equivalent to the management apparatus 5, and the controller unit 42 may be used to uniformly manage the backup processing.

As a result of the various configurations described in detail above, embodiments of the invention may include one or more following advantages, some of which have been discussed above.

Although the described storage apparatus is using the login request from the host apparatus as the trigger for performing the backup processing, because a snapshot is performed for a volume associated with a login request without directly creating a replication volume, the inventive system is capable of responding to the login request without causing an inconvenience to users such as excessive waiting time for the login processing.

Moreover, because the storage apparatus uses the logoff request from the host apparatus as the trigger for performing the backup processing, a snapshot is performed to the volume associated with a logoff request. Thus, it is possible to efficiently create a replication volume associated with a volume subject to a snapshot operation during the subsequent background processing.

Therefore, it is possible to prevent incomplete backup and perform efficient backup even in systems set with a relatively small backup window and high degrees of utilization by users. Further, it will be possible to efficiently perform backup within the backup window to numerous data volumes.

The present invention can be broadly applied to a storage apparatus storing data to be processed in a computer system. In particular, the present invention can be applied to a storage apparatus to be used for the backup and restoration/recovery of data in order to prevent the loss of data. Moreover, various aspects and/or components of the described embodiments may be used singly or in any combination in the computerized storage apparatus.

What is claimed is:

1. A storage apparatus, which is operatively connected to a host apparatus and a management apparatus, comprising:
   a disk device comprising one or more volumes; and
   a controller unit configured to control the disk device,
   wherein, when the controller unit receives a session login request corresponding to a session associated with a volume, the session login request being sent from the host apparatus, the controller unit performs a snapshot operation on the volume to acquire a snapshot image before performing a login process on the volume according to the session login request, and
   wherein the controller unit creates a replication volume based on the acquired snapshot image, and
   wherein, when the controller unit receives the session login request during the creation of the replication of the volume, the controller deletes the replication of the volume.

2. The storage apparatus according to claim 1, wherein the login session request is a login request in accordance with an iSCSI standard.

3. The storage apparatus according to claim 1, wherein, when the controller unit receives a session logout request corresponding to the session associated with the volume, the session logout request being sent from the host apparatus, the controller unit performs a snapshot operation on the volume to acquire a snapshot image after performing a logout process on the volume according to the session logout request.

4. The storage apparatus according to claim 3, wherein the session logout request is a logoff request in accordance with an iSCSI standard.

5. The storage apparatus according to claim 1, wherein the management apparatus has backup management information for managing the status of backup processing of the one or more volumes; wherein the controller unit comprises session management information for managing a status of the session between the host apparatus and the one or more volumes, and wherein the management apparatus is operable to issues a command to the controller unit, the command causing backup processing to be performed with respect to the one or more volumes based on the backup processing status indicated in the backup management information and the session status indicated in the session management information.

6. The storage apparatus according to claim 5, wherein the management apparatus is operable to issue a command to the controller unit, the command causing either the snapshot to be performed or the replication volume to be created depending on the backup processing status indicated in the backup management information.

7. The storage apparatus according to claim 6, wherein the management apparatus is operable to identify volumes with respect to which a session has not been established with the host apparatus based on the session status indicated in the session management information, and issue a command to the controller unit, the command causing the snapshot to be performed with respect to at least one volume with respect to which the snapshot has not been performed among the specified volumes based on the backup processing status indicated in the backup management information.

8. The storage apparatus according to claim 6, wherein the management apparatus is operable to specify volumes with respect to which a session has not been established with the host apparatus based on the session status indicated in the session management information, and issue a command to the controller unit, the command causing the replication to be performed with respect to at least one volume with respect to which the snapshot has been performed but the replication volume has not been created among the specified volumes based on the backup processing status indicated in the backup management information.

9. The storage apparatus according to claim 1, wherein the controller unit is operable to delete the acquired snapshot image after performing the replication.

10. A method for managing data in a storage apparatus, which is operatively connected to a host apparatus and a management apparatus, comprising:
  receiving from the host apparatus a session logon request corresponding to a session associated with a volume hosted by a disk device of the storage apparatus;
  prior to performing a logon process in response to the logon request, performing a snapshot operation acquiring a snapshot image by performing a snapshot of a volume based on the session logon request; and
  creating a replication volume based on the acquired snapshot image,
  wherein, when the session login request is received during the creation of the replication of the volume, the replication of the volume is deleted.

11. The method according to claim 10, wherein the session request is a login request in accordance with an iSCSI standard.

12. The method according to claim 10, wherein when the session logout request corresponding to the session associated with the volume is received, the session logout request being sent from the host apparatus, performing a snapshot operation on the volume to acquire a snapshot image after performing a logout process on the volume according to the session logout request.

13. The method according to claim 12, wherein the session logout request is a logoff request in accordance with an iSCSI standard.

14. The data backup method according to claim 10, further comprising:
  monitoring the backup status of the one or more volumes; and
  monitoring the session status of the one or more volumes;
  wherein backup processing of the one or more volumes is performed based on the backup status and the session status.

15. The method according to claim 14, wherein either the snapshot is performed or the replication volume is created depending on the backup processing status.

16. The data backup method according to claim 15, further comprising specifying volumes in which a session has not been established with the host apparatus based on the session status; and
  wherein the snapshot is performed to at least one volume in which the snapshot has not been performed among the specified volumes based on the backup processing status.

17. The data backup method according to claim 15, further comprising specifying volumes in which a session has not been established with the host apparatus based on the session status; and
  wherein the replication volume is created to at least one volume in which the snapshot has been performed but the replication volume has not been created among the specified volumes based on the backup processing status.

18. The data backup method according to claim 15, wherein, upon receiving the session request during creating of the replication volume, the replication volume being created is destroyed.

* * * * *